United States Patent

Buckson

[15] 3,693,939
[45] Sept. 26, 1972

[54] TENSION CONTROL SYSTEM
[72] Inventor: Wilson C. Buckson, Wilmington, Del.
[73] Assignee: All American Industries, Inc., Wilmington, Del.
[22] Filed: April 22, 1971
[21] Appl. No.: 136,475

[52] U.S. Cl. ............................................. 254/172
[51] Int. Cl. .............................................. B66d 1/48
[58] Field of Search .............. 254/172, 173, 150, 186

[56] References Cited

UNITED STATES PATENTS

| | | | |
|---|---|---|---|
| 3,507,478 | 4/1970 | Lewis | 254/172 |
| 3,612,486 | 10/1971 | Martin | 254/172 |

FOREIGN PATENTS OR APPLICATIONS

| | | | |
|---|---|---|---|
| 1,147,063 | 4/1969 | Great Britain | 254/172 |

*Primary Examiner*—Harvey C. Hornsby
*Attorney*—Connolly & Hutz

[57] ABSTRACT

The brake on an energy absorbing winch is controlled to maintain a predetermined tension in its line during payout by an electronic control circuit having a summing amplifier which operates the brake in response to several signals in various combinations. A signal corresponding to the deviation between the actual line tension and the preset tension is generated by a differential amplifier having inputs of actual and desired tension. Preliminarily and during initial payout, a derivative amplifier modulates the deviation and applies a corrective signal to the summing amplifier, which corresponds to the derivative of the tension deviation with respect to time. The derivative corrective signal immediately releases the brake on capture and initiation of payout. A switch removes the derivative signal from the summing amplifier as soon as the derivative changes polarity from negative to positive, and connects an error integral amplifier between the differential amplifier and the summing amplifier to stably control the braking pressure to obtain the predetermined tension. The standard source binds the error integral amplifier to the predetermined tension before the error integral amplifier is switched into the control circuit. The switching is accomplished by a modified Schmidt-Trigger, which is originally in the neutral state. The derivative amplifier is operatively connected to the Schmidt-Trigger circuit. When the derivative of the deviation originally goes negative, it cocks the trigger circuit. The trigger is actuated when the derivative becomes slightly positive to operate a relay, which disconnects the deviation derivative amplifier from the summing amplifier and replaces it by the deviation integral amplifier. At the end of the arrestment when the actual drag load is below the predetermined tension, the integral amplifier is driven to saturation which applies the full brake pressure during reelingin of the line.

7 Claims, 10 Drawing Figures

Fig. 6. Tension

Fig. 7. Error Amplitude

Fig. 8. Derivative of Error de/dt

Fig. 9. Integral of Error

Fig. 10. Pressure

TENSION CONTROL SYSTEM

BACKGROUND OF THE INVENTION

This invention relates to a system for controlling the tension in a winch line and it more particularly relates to such a system for maintaining substantially constant tension in a recovery line while the energy of capture is being absorbed prior to reel-in. Very high energy loads are imposed on aerial recovery winches and the lines attached to them when various airborne objects such as drone aircraft, capsules or missiles are recovered in mid-air. The recovery line is highly stressed at the time of capture and must be rapidly payed out to absorb the impact energy and prevent it from breaking. This is usually achieved by manually releasing the brake enough to maintain the tension in the recovery line within allowable limits but manual control is inefficient, resulting in broken lines and unduly prolonged recoveries. An object of this invention is to provide a highly responsive and efficient control system for the brake on a recovery winch, which maintains the tension on its line substantially constant during capture and energy absorption. Another object is to provide such a system which is simple, quick-acting, dependable and economical.

SUMMARY OF THE INVENTION

The brake on an energy absorbing winch is electronically controlled to maintain a predetermined tension on its line during payout. The actual tension in the line is compared with a predetermined tension, and the brake pressure is accordingly adjusted to maintain the predetermined tension. Before initiation of the payout, the system is biased to apply a brake pressure which obtains the predetermined tension under normal operating conditions. When payout actually begins, a corrective signal is generated corresponding to the derivative of the deviation from the predetermined tension. This throws the brake immediately off and allows the line to rapidly pay out. As soon as the actual tension begins to drop and the derivative changes polarity, the derivative signal is switched out of the control circuit; and the integral of the deviation between actual and predetermined tension is applied to control the braking. This provides a stable correction at the end of the arrestment. The actual tension then drops to drag load level, which is somewhat lower than the predetermined tension. This drives the integral function into saturation and thus causes the brake to apply full pressure while the line is being reeled in.

The aforementioned mode of operation is performed by an electronic control circuit having a summing amplifier which operates the brake in response to several signals in various combinations. A signal corresponding to the deviation between the actual line tension and the preset tension is generated by a differential amplifier having inputs of actual and desired tension. Preliminarily and during initial payout, a derivative amplifier modulates the deviation and applies a corrective signal to the summing amplifier, which corresponds to the derivative of the tension deviation with respect to time. The derivative corrective signal immediately releases the brake on capture and initiation of the payout. A switch removes the derivative signal from the summing amplifier as soon as the derivative changes polarity, from negative to positive, and connects an error integral amplifier between the differential amplifier and the summing amplifier to stably control the braking pressure to obtain the predetermined tension. The standard source may be used to bind the error integral amplifier to the predetermined tension before the error integral amplifier is switched into the control circuit. An effective switching circuit is provided by a modified Schmidt-Trigger, which is originally in the neutral state. The derivative amplifier is operatively connected to the Schmidt-Trigger circuit. When the derivative of the deviation originally goes negative, it cocks the trigger circuit. The trigger is actuated when the derivative becomes slightly positive to operate a relay, which disconnects the deviation derivative amplifier from the summing amplifier and replaces it by the duration integral amplifier. At the end of the arrestment when the actual drag load is below the predetermined tension, the integral amplifier is driven to saturation which applies the full brake pressure during reeling-in of the line.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENT

Figure 1:
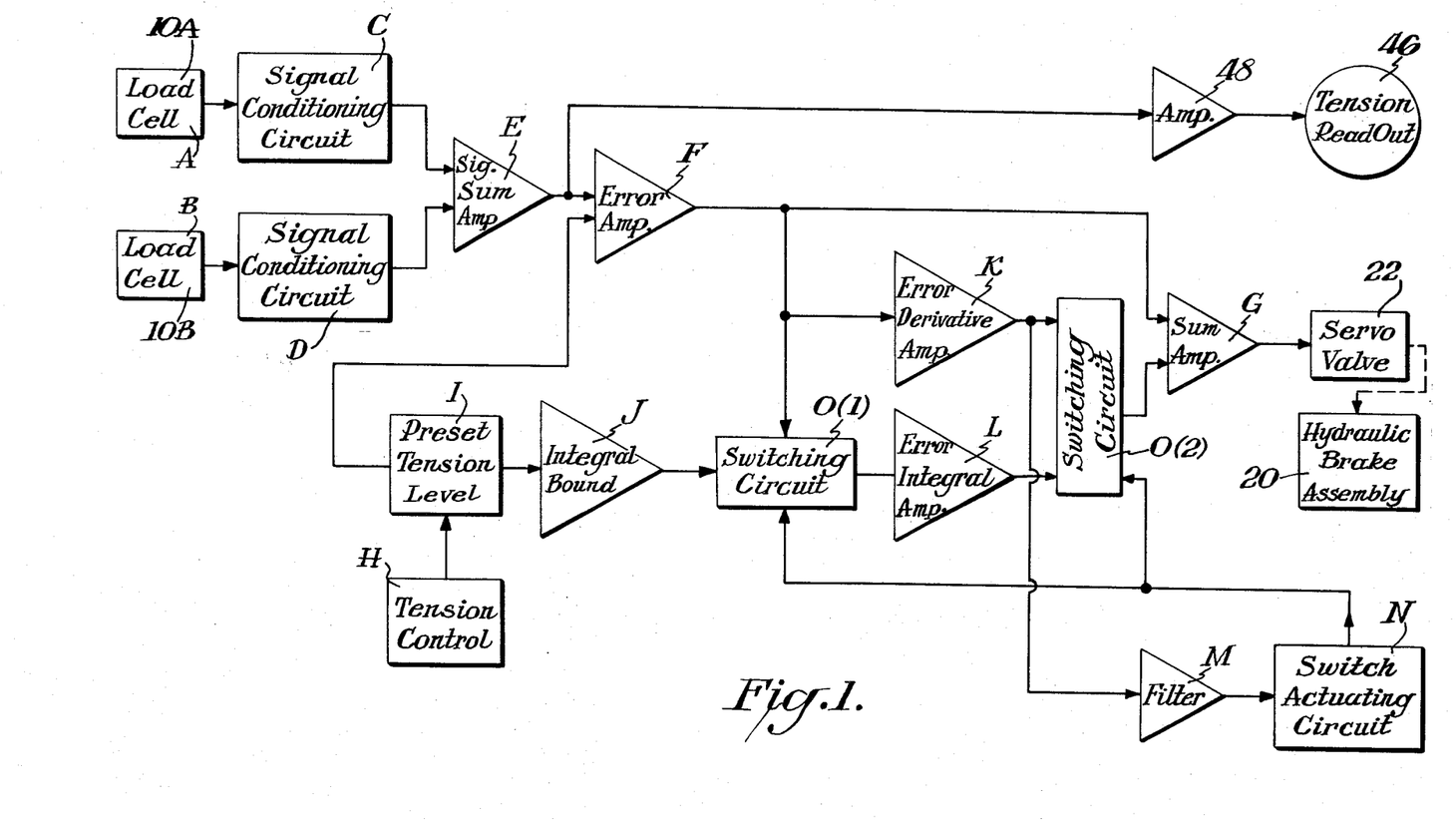
FIG. 1 is a schematic diagram of one embodiment of this invention.
Figure 2:
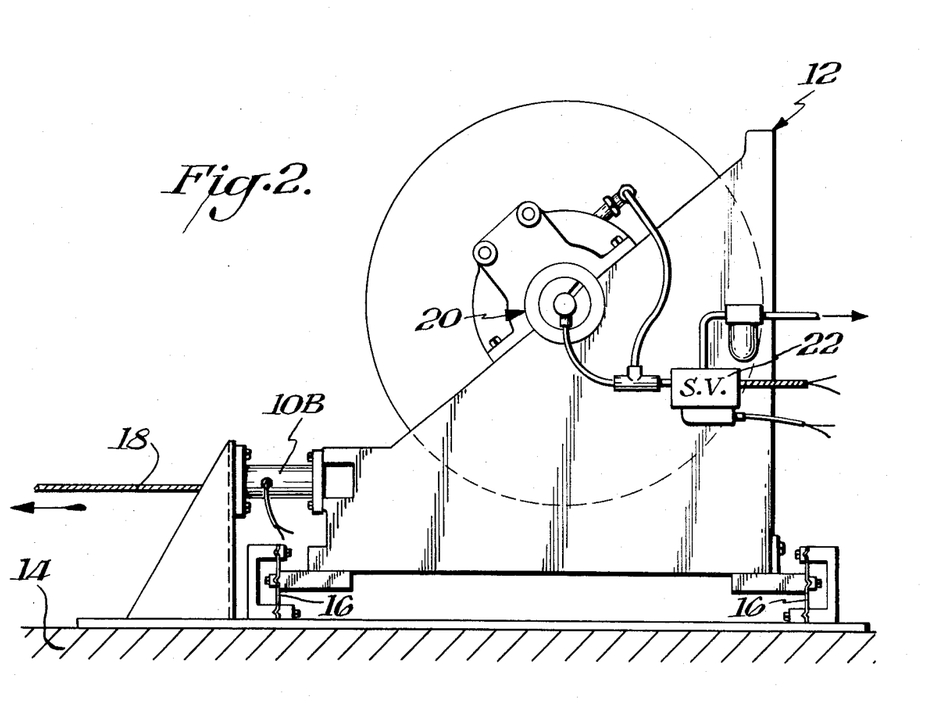
FIG. 2 is a side view in elevation of a winch whose brake is controlled by the system shown in FIG. 1.
Figure 3:
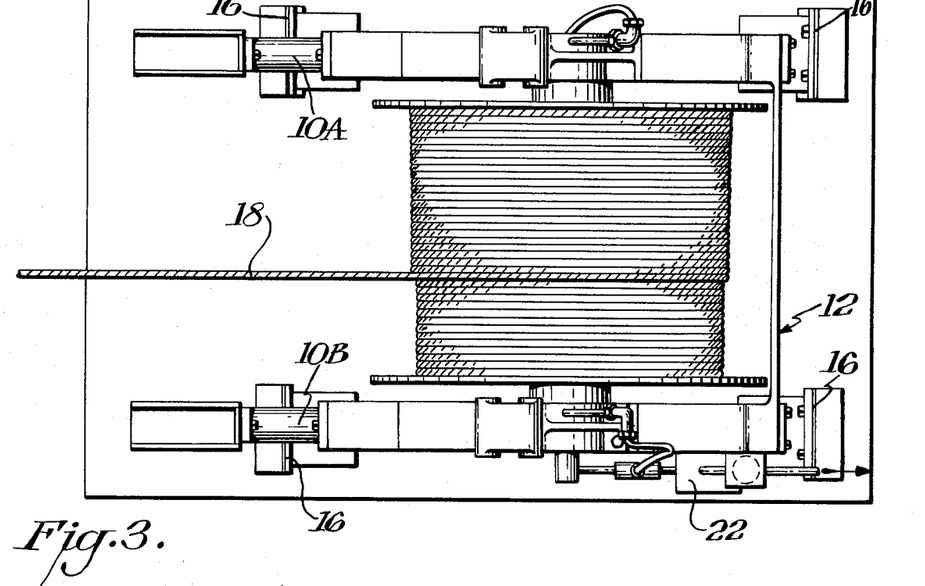
FIG. 3 is a top plan view of the winch shown in FIG. 2.

FIG. 1 is a schematic diagram of a control system for maintaining the tension of a recovery line on the winch shown in FIGS. 2 and 3 substantially constant during mid-air capture of an object and absorption of its energy by payout until the object may be safely reeled in. This operation is, for example performed, during aerial recovery of parachuting objects such as drone aircraft noses, space capsules or missiles reentering the atmosphere. Load cells 10A and 10B are connected between winch 12 and recovery aircraft frame 14. Load cells 10A and 10B are of the strain gauge type. Winch 12 is supported on flexure mounts 16 which allow winch 12 to move relative to aircraft frame 14 in accordance with the tension on winch line 18. Load cells 10A and 10B therefore develop a signal corresponding to the tension on line 18. Hydraulic winch brake 20 in controlled by servo valve 22 which is for example an electrically operated valve.

Figure 4:
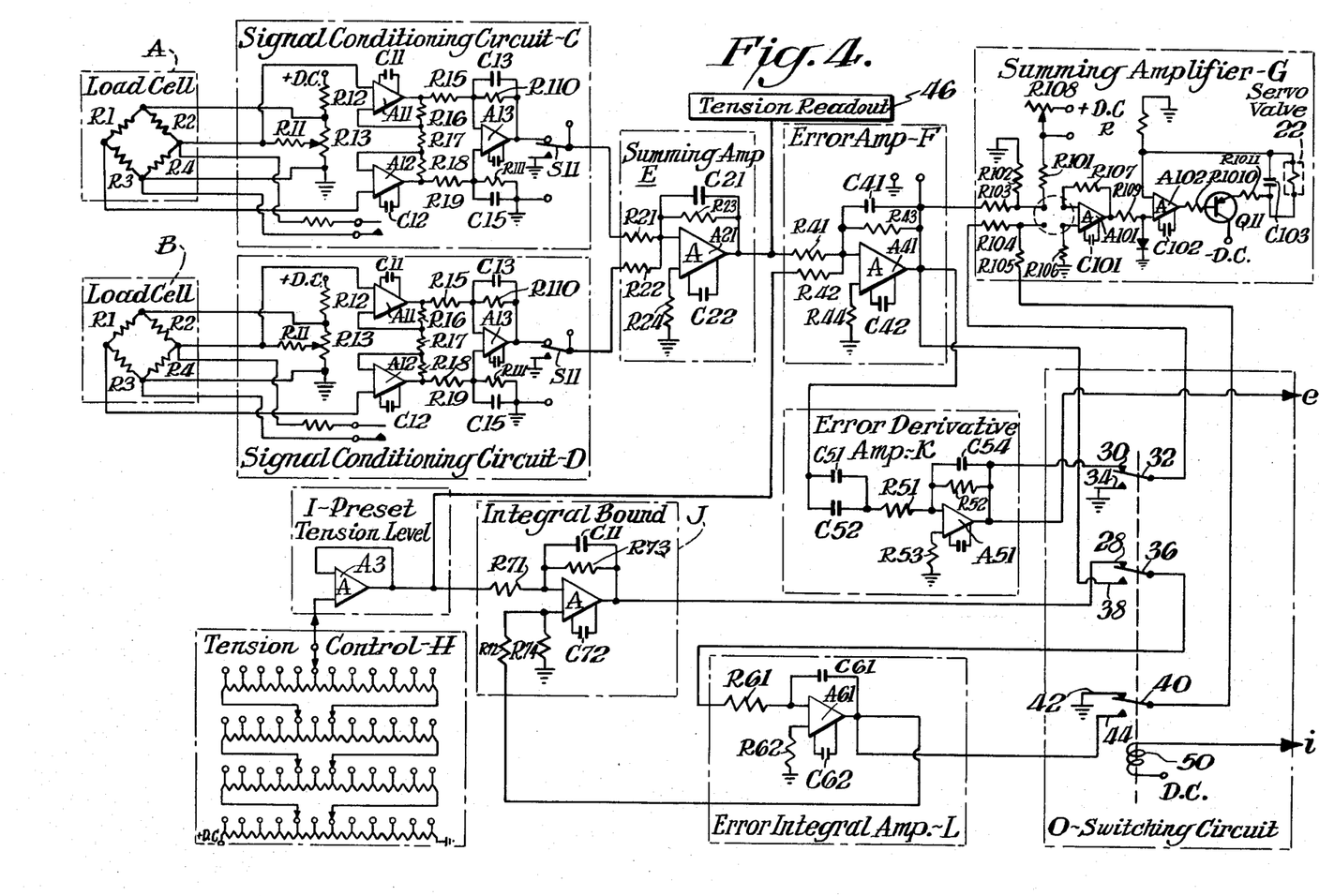
FIG. 4 is a detailed schematic diagram of the main portion of the system shown in FIG. 1.
Figure 5:
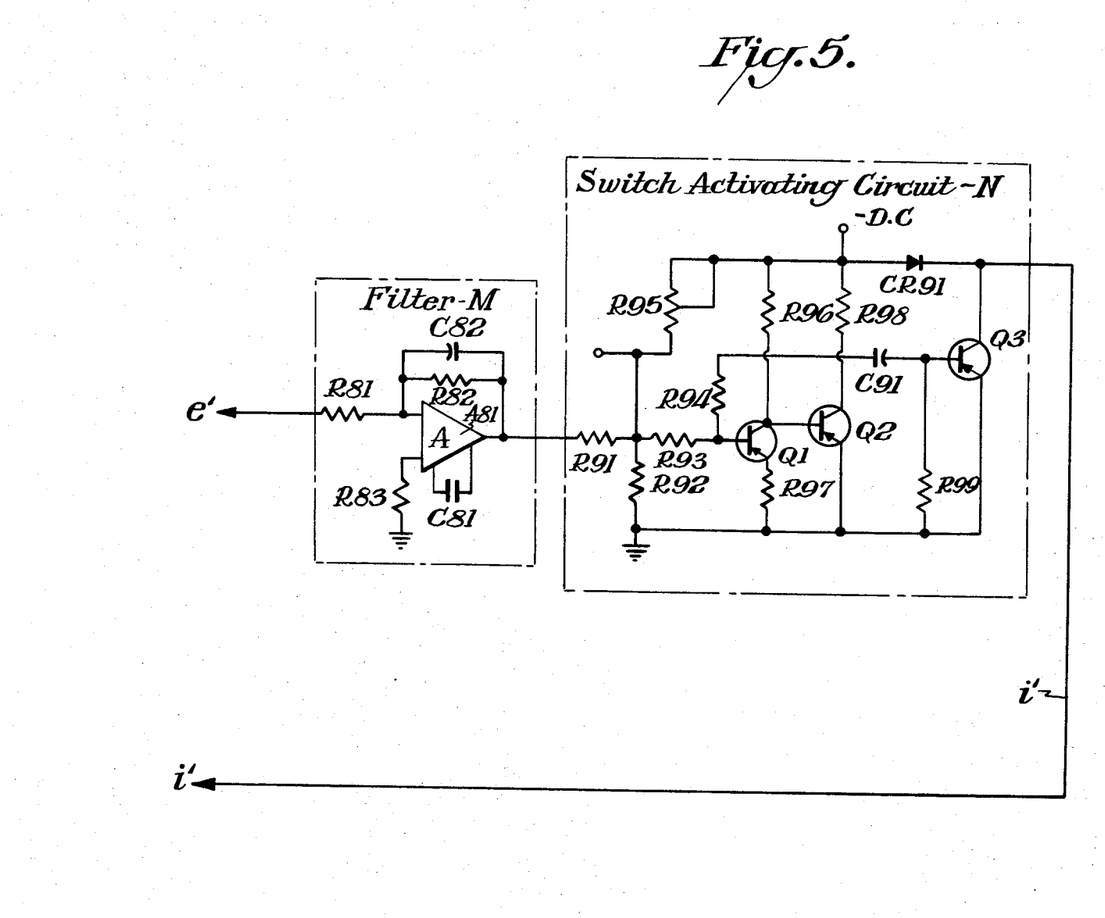
FIG. 5 is a detailed schematic diagram of the remaining portion of the system shown in FIG. 4.
Figure 6:
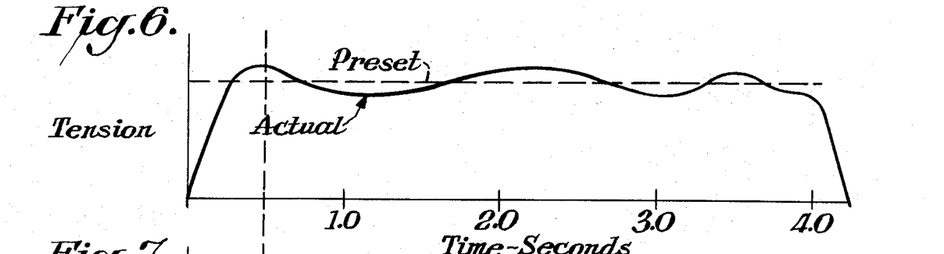
FIGS. 6–10 are curves showing parameters of the system against time from capture through complete energy absorption.

FIGS. 4 and 5 illustrate components used in each of the corresponding blocks shown in FIG. 1 for performing the indicated functions as follows:

BLOCKS A & B

Blocks A & B represent load sensors 10A and 10B used in the system to measure tension of line 18. Resistors R1, R2, R3, and R4 in both blocks represent strain gauges (not shown) attached to load sensitive metal in load cells 10A and B. With load applied to cells 10A and B and voltage applied between the junctions of R1–R2 and R3–R4, a voltage is produced between the junctions of R1–R3 and R2–R4 which is proportional to the applied load.

BLOCKS C & D

Blocks C & D represent signal conditioning circuits for load cells 10A and B. The network of resistors R11, R12 and R13 balances the output of the load cell to zero volts when there is no load applied to the cell. The arrangement of three operational amplifiers A11, A12, and A13 provide a high input impedance, high common mode rejection amplification circuit for the load cell signal. The network of resistors R16, R17 and R18 provides a variable gain control for the first stage of amplification. The first stage of amplification is accomplished with A11 and A12. The network of resistors R15, R19, R110 and R111 provides a fixed gain control for the second stage of amplification, A13. Switch S11 provides a manual means of removing the signal of one or both of the load cells from the remainder of the control.

BLOCK E

Block E represents the summing circuit that algebraically sums the signals from the two load cell signal conditioning units, Blocks C and D. The resistor network R21, R22 and R23 provide a fixed gain control for the summing amplifier A21. Resistor R24 provides a current balance for the unused input of A21. Capacitor C21 provides high frequency roll off for amplifier A21.

BLOCK F

Block F represents the error amplifier that produces a signal, which is the deviation or error between the actual tension signal from the summing amplifier E and the preset tension level signal (Block I). The resistor network R41, R42 and R43 fixes the gain of the amplifier and the relative comparison of the actual tension signal and the preset tension level signal. Resistor R44 provides a current balance for the unused input of the amplifier A41. Capacitor C41 is used for high frequency roll-off of the error signal and capacitor C42 is used for amplifier stability.

BLOCK G

Block G represents the summing amplifier driving servo valve 22, which controls the pressure of hydraulic brake 20. The summing amplifier sums the signals from the error amplifier, the error derivative amplifier, and the integral amplifier after it is brought into the circuit. The summing of these signals is accomplished with amplifier A101 in Block G. Resistors R101, R102, R103, R104 and R108 provide the input summing network for amplifier A101. Resistors R106 and R107 provide the feedback network and capacitor C101 is used for amplifier stability. Amplifier A102 and transistor Q11 supply a current drive that assures that the current through servo valve 22 is proportional to the input voltage to amplifier A102. Resistor R109 supplies current limiting between amplifier A101 and A102. Resistor R1010 supplies current limiting between A102 and Q11. Resistors R1010 and R1011 supply current limiting through Q11 and valve 22. Capacitor C103 is used for stability in the valve transistor circuit.

BLOCKS H & I

Block H represents a Kelvin-Darley voltage divider whose output is directly proportional to the desired preset tension level. The output of the voltage divider is fed through amplifier A3 in Block I to provide a low output impedance signal the same level as the voltage divider output.

BLOCK J

Block J represents the integral bound circuit, which assures that the integrator is held a level equal to the preset tension level until the integrator is put actively into the circuit by the switching trigger and hold circuit, Block O. Resistors R71 and R72 are the input circuits to the amplifier and resistors R73 and R74 are the feed back circuits. The ratio of R71 and R73 determines the gain of the bound amplifier. Capacitor C71 provides high frequency roll-off for the circuit and capacitor C72 is used for amplifier stability.

BLOCK K

Block K represents the circuit that produces the mathematical derivative of the deviation or error signal that is produced in Block F. Capacitors C51 and C52 and resistor derivative supply the coupling circuit between the error signal and the deriviative amplifier. Capacitor C54 and R52 provide the feedback network of the derivative amplifier and also provide the determination of the high frequency roll-off point. Resistor R53 provides a current balance for the unused input of the amplifier 51. Capacitor C53 is used for amplifier stability.

BLOCK L

Block L represents the circuit that produces the mathematical integral of the error signal that is produced in Block F. Resistor R61 and capacitor C61 supply the input and feedback circuits for the amplifier and also determine the time constant for the integrator. Resistor R62 provides a current balance for the unused input of the amplifier and capacitor C62 is used for amplifier stability.

BLOCK M

Block M represents the filter circuit that filters the derivative signal before it is inserted into the switching circuit. Resistor R81 is the input circuit to the amplifier 81 and capacitor C82 and resistor R82 comprise the feedback circuit. Capacitor C82 supplies the high frequency roll-off for the filtering effect. Resistor R83 supplies a current balance for the unused input of the amplifier and capacitor C81 is used for amplifier stability.

BLOCK N

Block N represents the switching circuit that makes the decision to switch the integrator into the circuit at the same time the integrator is removed from the bound circuit. The circuit is arranged such that normally Q1 is on, Q2 is off and Q3 is off. As the derivative of the error becomes negative, Q1 turns off, Q2 turns on and Q3 sees a positive pulse which keeps it turned off. As the derivative signal becomes positive (for example at +0.5 volts) Q1 turns on, Q2 turns off and Q3 sees a negative pulse which turns Q3 on and closes the relay down in Block O by making relay coil 50 conduct. Resistors R91, R92, R93 and R95 supply a bias circuit to assure that Q1 is on in the quiescent stage. Resistor R96 is collector load for Q1, and resistor R97 supplies more base bias for Q1. Resistor R98 is the collector load for Q2 and resistor R94 supplies feed back from Q2 and Q1. Capacitor C91 is the coupling capacitor between Q2 and Q3 while resistor R99 assures Q3 is off when there is no signal through C91. The relay coil in Block O is the collector load for Q3.

OPERATION

Winch 12 is mounted on flexures 16 that allow free movement only in the plane in which winch line 18 lies. The actual motion in this plane is restricted by two load cells 10A and 10B mounted in the same plane or in a plane parallel with winch line 18. Overturning moments and twisting moments are resisted by flexure mounts 16.

The signals from the two load cells 10A and 10B are fed into signal conditioning circuits C and D, which provide a voltage output proportional to the load in each cell 10A and 10B. The voltage-load relationship is fixed to a design ratio and is verified by laboratory test. The outputs from the two signal conditioning circuits C and D are fed into signal summing amplifier E to provide an output proportional to line tension.

The output of signal summing amplifier E is fed into one side of deviation or error amplifier F, whereas the other input to error amplifier F is a signal from preset tension level Block I through line 24 proportional to the desired tension level. If the two signals differ, i. e., the actual line tension signal is different from the preset tension signal, error amplifier F has an output proportional to the magnitude of this deviation or error. The output of error amplifier F is fed into three separate circuits, which are: (1) servo valve summing amplifier G; (2) deviation derivative amplifier K; and (3) deviation integral amplifier L.

The error signal into servo valve summing amplifier G is used to correct the brake pressure to provide a tension that gives zero deviation error from preset. During the course of a normal recovery, the following operations occur within the control circuit:

Initially, integral amplifier L is not connected to summing amplifier G or to error amplifier F. The input to integral circuit L is connected to the preset tension level control I and integral bound circuit J through line 26 and relay contact 28 in switching circuit O. Integral amplifier L, when it is switched into the control circuit, thus has an output exactly equal to the preset level.

Figure 7:
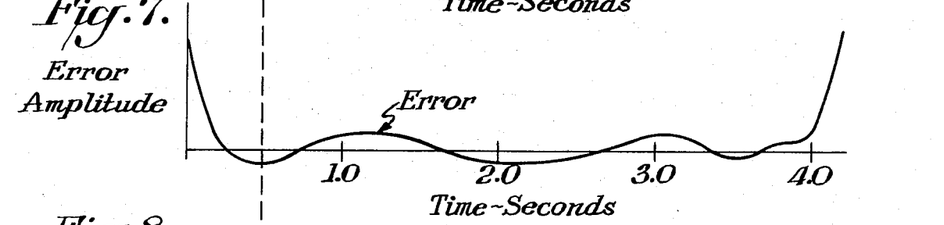

Also initially, the output of derivative amplifier K is connected through relay contact 30 to summing amplifier G to provide maximum rate of change at impact. Error amplifier F is preliminarily putting out an error signal exactly equal to the preset level because there is zero actual tension prior to impact. At the moment of impact, the error signal from amplifier F decreases (as shown in FIG. 7) and tends to drive the brake off. The derivative signal from amplifier K is added to the unmodulated error signal to throw the brake off as quickly as possible to allow the drum rpm of winch 12 to rapidly build up to reduce the load to only inertial character.

Figure 8:
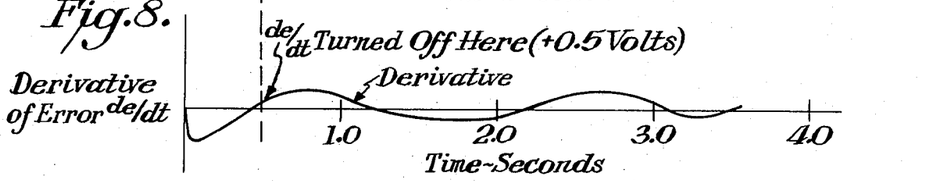
Figure 9:
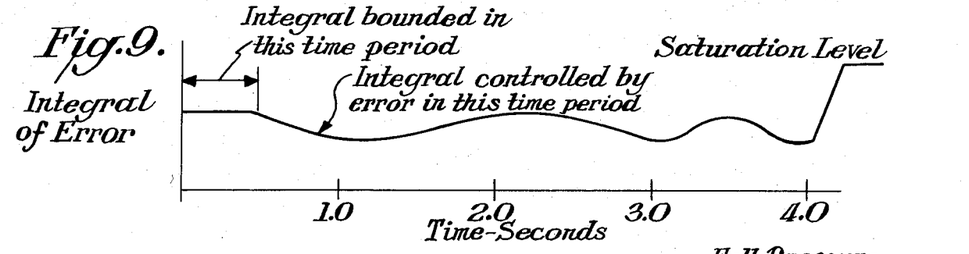

The derivative signal goes from zero to some maximum value during impact as shown in FIG. 8 (maximum value of the derivative is proportional to the engaging velocity) and then returns to zero. Switch actuating circuit N senses the above sequence and (as shown in FIGS. 8 and 9) switches the derivative out of control (by changing relay contactor 32 to ground contact 34) and the integral into control when the derivative function becomes slightly positive, at for example, +0.5 volts. When the integral is switched into the control, its input is disconnected from the preset level and transferred to error amplifier F, by switching relay contactor 36 from integral bound contact 28 to error amplifier contact 38 and by switching relay contactor 40 (connected to summing amplifier G) from ground contact 42 to integral amplifier contact 44.

The error signal then corrects the brake setting directly and through the integral function to provide a zero error condition. The derivative is no longer utilized because its rapid correction after impact would overshoot and tend to induce high frequency oscillations of the tension level. The derivative function is, therefore, only used during impact, and its use eliminates the requirement to provide holding brake settings, initial brake settings, and time delay. The derivative function allows the tension to build to preset level as quickly and as efficiently as possible.

Figure 10:
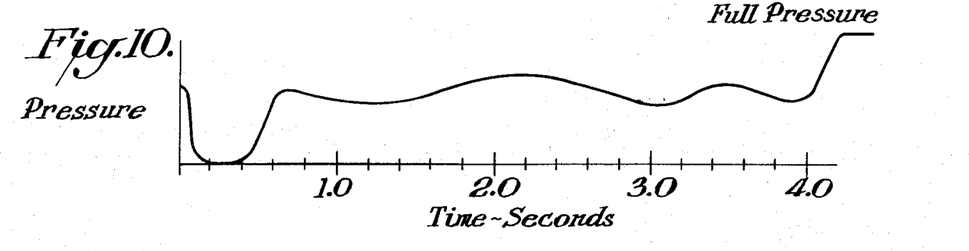

In final portions of the arrestment, the actual tension falls to the drag load level, which is somewhat lower than the preset tension. This produces a positive error signal which drives the integral function into saturation. When the integral is at saturation, full brake pressure is applied to the brake. The result is that after a pick-up, the brakes automatically go to full pressure or to an automatic final brake for reel-in operations (as shown in FIG. 10). Graphical representations of the various signals, tension, and pressure levels experienced during a normal recovery are shown in FIGS. 6–10.

At time zero, or at the moment of impact, the actual tension (in FIG. 6) is zero, the error signal (FIG. 7) is exactly equal to the preset level, the derivative (FIG. 8) is zero, and the integral function (FIG. 9) is bound to the preset level. In this state the brake pressure (FIG. 10) is at a level which approximates the preset level in tension.

As the tension begins to increase, the error signal and the derivative both add to remove the brake pressure to allow the drum to increase speed and reduce the load on the line to solely inertial loads. After the tension has overcome the inertial loads of the system, the tension begins to decrease to result in a negative deviation and a point of inflection in the error curve. At this point of inflection, the derivative passes zero to become positive and is removed from control. Simultaneously, the integral is put into control to modulate the error signal for stable correction of brake pressure. At the end of the arrestment or when the drum stops, the actual tension decreases and the integral goes to saturation to give full brake pressure. The actual tension may be read out through gauge 46 connected between blocks E and F through amplifier 48.

I claim:

1. A method of controlling a brake to maintain the tension of the line of a recovery winch substantially constant during payout and after capture of an object comprising the steps of preliminarily utilizing a preset signal to maintain a predetermined tension in said line prior to capture of said object, upon capture of said object generating corrective signals corresponding to the derivative and integral of the deviation from said predetermined tension, first applying said derivative signal to said brake for rapidly throwing it off and allowing said line to payout and achieve inertial loads, also utilizing said derivative signal to switch said derivative signal out of control of said brake when said derivative signal changes polarity and to switch said integral signal into control of said brake whereby a more stable correction is ultimately provided.

2. A method as set forth in claim 1 wherein the direct deviation is utilized in conjunction with first said derivative signal and then in conjunction with said integral signal to maintain said predetermined tension.

3. A method as set forth in claim 1 wherein said integral is preliminarily bounded to said preset level to bring it into control substantially at said predetermined tension.

4. A control system for operating a winch brake to maintain the tension on a recovery line substantially constant during capture and payout comprising load detecting means for measuring the tension in said line, a signal conditioner for generating a signal corresponding to said tension, a deviation amplifier, a preset source for feeding a preset signal corresponding to said predetermined tension to said deviation amplifier, said signal conditioner providing another input to said deviation amplifier whereby said deviation amplifier compares said signals and generates a corrective signal, a summing amplifier connected to said winch brake, input means to said summing amplifier connecting said corrective signal from said deviation amplifier thereto whereby said brake is controlled to provide said predetermined line tension, a deviation derivative amplifier, an input and output circuit connecting said deviation derivative amplifier between said deviation amplifier and said summing amplifier whereby a signal corresponding to the derivative of said deviation is connected to said summing amplifier, a deviation integral amplifier, an input and output circuit connecting said deviation integral amplifier between said deviation amplifier and said summing amplifier whereby a signal corresponding to the integral of said deviation is connected to said summing amplifier, a switch in said input and output circuits, an actuator in said switch, said output circuit connecting said derivative amplifier to said actuator to operate said switch whereby said derivative amplifier is preliminarily connected in said system and said integral amplifier is connected out of said system prior to capture and the reverse of said connections when said derivative signal changes polarity.

5. A control system as set forth in claim 4 wherein said switch is preliminarily in a neutral condition, is cocked when said derivative becomes negative, and is then actuated when said derivative becomes slightly positive.

6. A control system as set forth in claim 5 wherein said switch and actuator comprises a Schmidt-Trigger circuit.

7. A control system as set forth in claim 4 wherein said integral amplifier is preliminarily connected to said preset tension level to maintain it substantially at said preset tension level prior to utilization in said control circuit.

* * * * *

UNITED STATES PATENT OFFICE
CERTIFICATE OF CORRECTION

Patent No. 3,693,939    Dated September 26, 1972

Inventor(s) Buckson, Wilson C.

It is certified that error appears in the above-identified patent and that said Letters Patent are hereby corrected as shown below:

In the Abstract, last line, "reelingin" should read --reeling in--.

Column 4, line 34, after "resistor" insert --R51-- and delete "derivative."

Signed and sealed this 10th day of July 1973, (SEAL)
Attest:

EDWARD M. FLETCHER, JR.         RENE TEGTMEYER
Attesting Officer               Acting Commissioner of Patents